United States Patent [19]

Tatini

[11] Patent Number: 4,871,563
[45] Date of Patent: Oct. 3, 1989

[54] PROCESS FOR CONTROL OF FOOD PATHOGENS

[75] Inventor: Sita R. Tatini, St. Paul, Minn.

[73] Assignee: Regents of the University of Minnesota, Minneapolis, Minn.

[21] Appl. No.: 53,353

[22] Filed: May 22, 1987

[51] Int. Cl.⁴ ................................................ A23C 4/00
[52] U.S. Cl. ..................................... 426/334; 426/43; 426/326; 426/335; 426/641
[58] Field of Search ................ 426/131, 326, 310, 34, 426/334, 335, 641, 43

[56] References Cited

U.S. PATENT DOCUMENTS 4,288,459 9/1981 Baker ................................ 426/34 X Primary Examiner—Donald E. Czaja
Assistant Examiner—Celine T. Callahan
Attorney, Agent, or Firm—Vidas and Arrett

[57] ABSTRACT

A process for preserving canned, low-acid foods comprising the steps of adding diacetyl, which may be in the form of a starter distillate, to food and heating the canned food to render the food commercially sterile. The diacetyl lowers the temperature required for processing and remains in the food product at a level sufficient to kill germinating bacterial spores.

4 Claims, No Drawings

PROCESS FOR CONTROL OF FOOD PATHOGENS

I. DESCRIPTION

1. Field of the Invention

This invention relates to methods for achieving botulinum safety in low-acid canned foods by the use of diacetyl compounds in conjunction with heat.

2. Background of the Invention

In order to render canned foods safe and to prevent them from spoiling under the usual conditions of storage, some form of commercial sterilization is required. The current methods of preservation of foods include pasteurization and pressure sterilization.

Control of foodborne bacterial pathogens such as Salmonella, Shigella, enteropathogenic Escherichia coli, Campylobacter sp., and Yersinia sp. is currently achieved by heat treatments such as pasteurization (62.8° C. for 30 minutes or 71.7° C. for 15 seconds). Heat treatments higher than pasteurization (100°–115° C. for varying periods but equal to F121C of 3 or 0.3 minutes) are used to provide Clostridium botulinum safety in low-acid canned foods and canned cured meats. Low-acid products have a pH of 5.09 and above and include most meat and marine products, corn, peas, lima beans, asparagus and spinach. In the latter products, inhibition of surviving spores from the Clostridium botulinum is often achieved by $NaNO_2$ and/or potassium sorbate. The basis for the heat treatment required to render canned foods "commercially sterile" is the destruction of Clostridium botulinum spores that produce neurotoxins. The processing failures (lower heat treatment than an F. value of 3 minutes) or recontamination due to leaks in the can present serious threat to public health safety. There have been large recalls of canned products that were associated with human deaths in the United States.

Although the high heat treatments tend to provide long-term storage of food at room temperature, they demand high levels of energy and are, therefore, expensive.

Searches for chemical compounds that are natural components of foods that may have antimicrobial properties indicated that -diacetyl, which is a flavoring additive used in the food industry, may inhibit certain types of bacteria such as Escherichia coli, Salmonella and Staphylococcus. However, the effectiveness of diacetyl on inhibition or destruction of bacteria varies by the bacteria type and also varies with the growth medium. Testing previously has indicated that diacetyl is least inhibitory or destructive in cooked meat or brain heart infusion media. As reported by author James M. Jay in "Antimicrobial Properties of Diacetyl," *Applied and Environmental Microbiology,* Vol. 4, No. 3, page 525 (Sept. 1982) diacetyl is ineffective against clostridia under anaerobic conditions.

BRIEF SUMMARY OF THE INVENTION

The process of the invention involves the use of specific levels of diacetyl, particularly in the form of a starter culture metabolite solution combined with low level heating on the order of between 75 and 110° C. to kill bacterial cells. During storage, this process will also kill the germinating cells from spores that are normally associated with spoilage and/or botulism. In particular, it was found that the process of the invention provides effective inhibition of Clostridium in addition to the foodborne bacterial pathogens described above which are more readily controlled than Clostridium botulinum.

DETAILED DESCRIPTION OF THE INVENTION

A composition known as commercial starter distillate which contains diacetyl is available from Chris Hansen's Laboratory, Inc. of Milwaukee, Wisconsin. The preparation of the starter distillate is well known and is described in the Federal Register of the United States at Vol. 48, No. 221, pages 51906–1983 and Vol. 47, No. 152, pages 34155–8 in 1982. Typically, the starter distillate is the distillation product of a culture of Streptococcus lactis subspecies diacetilactis which is grown in skim milk. The distillate includes diacetyl, lactic acid and ethylacetate. The compound is typically utilized as a flavoring additive since diacetyl has a butter-like flavor. About 2 percent of the starter distillate is diacetyl. The starter distillate is available from Chris Hansen's Laboratories Inc. in a 15 ppm or 1,000 ppm solution. Typically, the starter distillate is used as a flavoring additive in quantities of about 0.01% to 0.5% in substances such as margarine or to flavor popcorn. Members of the genus Leuconostoc are also used to produce diacetyl.

*S. aureus, S. typhimurium* and *E. coli* were grown in brain heart infusion broth (BHI) for 18 hours at 37° C. and a predetermined amount of each was added to BHI or whole milk to yield $10^7$ per mil initial levels of bacteria. Ten milliter quantities were placed in sterile screw-cap tubes (15×150 mm) and heated in a water bath with controlled temperature (54.5±0.5° C.). The tubes were cooled in ice water and the bacteria were enumerated on Tryptic Soy agar plus 7.5% NaCl, Violet Red Bile agar and Tryptic Soy agar (all from Difco). Clostridium sporogenes (PA3679) GCI (50) DT spores prepared in beef heart infusion and stored in phosphate buffer were added to the product to obtain an initial level of $10^5$ spores per gram. Spores were enumerated on yeast extract agar containing soluble starch, dextrose, sodium thioglycollate and sodium carbonate with incubation of the plates in anaerobic BBL Gaspak jars (with $H_2+CO_2$ Gaspak generators) at 30° C. for 48 hours. Food products with bacteria added were tested in the screw-cap tubes (18×150 mm) or in thermal death time cans (208×006) designed by American Can Company both of which were heated in miniature retorts. Diacetyl levels were determined by gas chromatography.

The data shown in Table 1 illustrates the enhancement of destruction by bacteria when using heat combined with commercial starter distillate or diacetyl. A three log increase in S. aureus and a five log increase in *S. Typhimurium* and *E. coli* destruction was evident over that seen with heat alone.

TABLE 1

Influence of commercial starter distillate and diacetyl on enhancement of thermal inactivation of *Staphylococcus aureus, Salmonella typhimurium* and *Escherichia coli,* in pasteurized whole milk at 54° C. for 15* minutes.

| Conc. of diacetyl (ppm) | pH | Bacterial count on media** indicated TSA | TSAS | VRB |
|---|---|---|---|---|
| None (no heat) | 6.65 | $4.4 \times 10^7$ | $1.1 \times 10^7$ | $1.5 \times 10^7$ |
| None (heat only) | 6.65 | $3.5 \times 10^6$ | $1.5 \times 10^4$ | $2 \times 10^5$ |
| 1,600 starter dist. | 6.50 | $1.3 \times 10^3$ | $2.5 \times 10^1$ | <10 |
| 800 starter dist. | 6.60 | $2 \times 10^4$ | $4 \times 10^1$ | <10 |
| 400 starter dist. | 6.60 | $1.4 \times 10^5$ | $5.5 \times 10^2$ | <10 |

TABLE 1-continued Influence of commercial starter distillate and diacetyl on enhancement of thermal inactivation of *Staphylococcus aureus*, *Salmonella typhimurium* and *Escherichia coli*, in pasteurized whole milk at 54° C. for 15* minutes.

| Conc. of diacetyl (ppm) | pH | Bacterial count on media** indicated | | |
|---|---|---|---|---|
| | | TSA | TSAS | VRB |
| 1,600 diacetyl | 6.60 | $2.7 \times 10^3$ | $3 \times 10^1$ | <10 |
| 2,500 diacetyl | 6.60 | $1.9 \times 10^3$ | $8 \times 10^1$ | <10 |

*Excluding a come-up time of 16 min to reach 54° C.
**See footnote to TABLE 1 for media.

Table 2 shows data relating to enhancement of thermal destruction of Clostridium sporogenes (PA3679) by starter distillate or diacetyl in foods heated at 110° C. There was a one log increase in destruction of spores (after 15 and 30 minutes) in Sirloin Burger brand vegetable and beef soup of Campbell Soup Co. and only slight to no enhancement in Cream Style Corn.

TABLE 2

Influence of commercial starter distillate and diacetyl on enhancement of thermal destruction of *Clostridium sporogenes* (PA3679)* in various food substrates at 110° C.

| Food substrate and additives | pH | Survivors after heating** for | |
|---|---|---|---|
| | | 15 min | 30 min |
| Sirloin Burger | 5.6 | $7.7 \times 10^3$ | $3 \times 10^2$ |
| Sirloin Burger + 1600 ppm starter distillate | 5.3 | $1.6 \times 10^2$ | $2 \times 10^1$ |
| Sirloin Burger + 1600 ppm diacetyl | 5.4 | $1.6 \times 10^2$ | $2.5 \times 10^1$ |
| Cream Style Corn | 6.8 | $3.6 \times 10^3$ | $3.3 \times 10^2$ |
| Cream Style Corn + 1600 ppm starter distillate | 5.9 | $1.4 \times 10^3$ | $1.8 \times 10^2$ |
| Cream Style Corn + 1600 ppm diacetyl | 6.0 | $1.9 \times 10^3$ | $1.1 \times 10^2$ |

**includes a thermometric lag of 2 min.

Table 3 shows data on inhibition of outgrowth of surviving spores in Cream Style Corn and Sirloin Burger incubated at 37° C. No outgrowth was seen in 4 of 4 cans even after 184 days in Cream Style Corn with starter distillate as compared to all 4 of 4 cans showing outgrowth within three weeks in the absence of starter distillate. That one of four cans showed outgrowth in Cream Style Corn plus starter distillate in the presence of additives, indicates that surviving spores are injured and will require additional nutrients and anaerobic conditions to grow. The data also indicates that the inhibitory influence of starter distillate on spores surviving in Sirloin Burger. Spores survived heat and were able to grow rapidly in Sirloin Burger with additives (3 to 4 days). In the presence of distillate there was a significant delay in outgrowth at 4 to 7 weeks even in the presence of additives. In the case of Sirloin Burger with distillate and no additives there was no outgrowth of spores (none of 5 cans) even after 124 days.

TABLE 3

Influence of commercial starter distillate on outgrowth of *Clostridium sporogenes* (PA3679) spores heated* in Cream Style Corn and Sirloin Burger (110° C. for 28 min) and incubated at 37° C.

| Heating Substrate | pH after heating | Length of incubation (days) | No. of cans positive for outgrowth/ total no. of cans |
|---|---|---|---|
| Cream Style Corn | 6.5 | 14–18 | 4/4 |
| Cream Style Corn plus additives** | 6.6 | 7–14 | 4/4 |
| Cream Style Corn plus 1100 ppm starter distillate plus additives | 6.6 | 184 | 1/4 |
| Cream Style Corn plus 1100 ppm starter distillate | 6.5 | 184 | 0/4 |
| Sirloin Burger plus additives | 6.0 | 3–4 | 5/5 |
| Sirloin Burger plus additives and 1600 ppm starter distillate | 6.0 | 7–60 | 5/5 |
| Sirloin Burger plus 1600 ppm starter distillate | 5.5 | 124 | 0/5 |

*In thermal death time cans; $1 \times 10^5$ spores per container.
**Additives: Dextrose, sodium thioglycollate and sodium bicarbonate The data presented here indicates the enhancement of heat destruction of Staphylococci and Salmonella and inhibition of surviving spores in foods. This low heat-starter distillate combination has a great potential for control of foodborne pathogens in low-acid foods. The use of commercial starter distillate combined with heat may serve as an effective substitute for nitrites in canned, cured meats for providing botulinum safety without the disadvantages of the nitrites. Contrary to the prior art teachings, it has been found that diacetyl at the proper levels when combined with heat will provide effective control of clostridium.

Further studies on the destruction and inhibition of Staphylococcus aureus in blood heart infusion media and Clostridium species (PA3679) in cooked meat at a pH of 7.2 have found that Staphylococcus aureus can be inhibited at levels of 0.01% or greater diacetyl in BHI at 15, 37 and 45° C. At higher levels of diacetyl 0.25, 0.5 and 1% and at higher temperatures the bacteria were rapidly killed. A five log increase in deaths of Staphylococcus aureus was due to the presence of 0.25% diacetyl at 55° C. It was also found that at 0.25% or higher levels, diacetyl is effective in killing Clostridium sporogenes (PA3679) in cooked meat medium combined with temperatures of 37° C. or greater.

The diacetyl starter containing distillate is an ideal choice as a preservative since it is already an acceptable food flavoring additive. Diacetyl in the starter distillate is rather pungent and imparts odor to food, however, the odor is limited by controlling the initial concentration of diacetyl. The concentration of diacetyl combined with heating provides destruction of bacteria and only residual levels of diacetyl will remain. The residual level of diacetyl will continue to kill germinating bacterial spores. The low level of diacetyl that remains is completely removed when the food is cooked prior to eating by the consumer.

In considering the invention it must be remembered that the disclosure is illustrative only and that the scope of the invention is to be determined by the claims.

What is claimed is:
1. The process for controlling foodborne pathogens in low-acid anaerobically packaged foods comprising the steps of:
    (a) adding from about 0.1% to about 1% diacetyl to a low-acid food product, and
    (b) heating the food product and diacetyl at a temperature of greater than about 75° and less than about 110° C. whereby the foodborne pathogens are substantially inhibited or killed.
2. The process of claim 1 wherein said diacetyl is in the form of a starter distillate.
3. The process of claim 1 wherein said foods are meat products.
4. The process of claim 1 wherein said diacetyl is added in an amount of between about 1100 and 2500 ppm and said food product is heated at a temperature of greater than about 75° and less than about 110° C. for between about 15 and about 30 minutes.

* * * * *